(12) United States Patent
Melatti et al.

(10) Patent No.: US 11,247,578 B2
(45) Date of Patent: Feb. 15, 2022

(54) ELECTRIC CHARGING STATIONS WITH DOCKING MANAGEMENT AND METHODS OF USE

(71) Applicant: Ford Global Technologies, LLC, Dearborn, MI (US)

(72) Inventors: Anthony Melatti, Dearborn, MI (US); Dale F. Jordan, III, Royal Oak, MI (US); Thomas Jorda, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 614 days.

(21) Appl. No.: 16/191,240

(22) Filed: Nov. 14, 2018

(65) Prior Publication Data

US 2020/0148068 A1    May 14, 2020

(51) Int. Cl.
| | | |
|---|---|---|
| *H02J 7/00* | (2006.01) | |
| *H02J 7/14* | (2006.01) | |
| *B60L 53/60* | (2019.01) | |
| *B60L 53/16* | (2019.01) | |
| *B60L 53/30* | (2019.01) | |

(52) U.S. Cl.
CPC ............. *B60L 53/60* (2019.02); *B60L 53/16* (2019.02); *B60L 53/305* (2019.02)

(58) Field of Classification Search
USPC ...................................................... 320/109
See application file for complete search history.

(56) References Cited

U.S. PATENT DOCUMENTS

| | | | | |
|---|---|---|---|---|
| 5,462,439 | A  * | 10/1995 | Keith ................. | G07F 15/005 |
| | | | | 320/109 |
| 9,421,878 | B2 | 8/2016 | Tremblay et al. | |
| 9,862,284 | B2 | 1/2018 | Kauffmann | |
| 2011/0106329 | A1* | 5/2011 | Donnelly ............. | B60L 53/65 |
| | | | | 700/291 |
| 2012/0161696 | A1* | 6/2012 | Cook ..................... | B60L 3/04 |
| | | | | 320/108 |
| 2013/0026985 | A1* | 1/2013 | McMullin ............ | B60L 53/14 |
| | | | | 320/109 |
| 2013/0041850 | A1* | 2/2013 | LaFrance ............. | B60L 53/66 |
| | | | | 705/412 |
| 2013/0241479 | A1 | 9/2013 | Wright, Jr. et al. | |
| 2015/0073642 | A1* | 3/2015 | Widmer ............... | G01C 21/36 |
| | | | | 701/22 |

(Continued)

FOREIGN PATENT DOCUMENTS

CN              105973313 A        9/2016

*Primary Examiner* — Alexis B Pacheco
(74) *Attorney, Agent, or Firm* — Brandon Hicks; Eversheds Sutherland (US) LLP

(57) ABSTRACT

Electric charging stations with docking management and methods of use are disclosed herein. An example system can include a base station providing electrical power, a charging interface configured to couple with a charging port of a vehicle and a cradle of the base station, a controller associated with at least one of the base station, the charging interface, or combinations thereof, the controller configured to execute a docking ruleset to determine when a docking failure occurs between the charging interface and the cradle of the base station and execute a remediating action in response to the docking failure.

20 Claims, 9 Drawing Sheets

(56) References Cited

U.S. PATENT DOCUMENTS

| | | | |
|---|---|---|---|
| 2015/0304406 A1* | 10/2015 | Penilla | B60L 53/65 |
| | | | 709/203 |
| 2016/0272074 A1* | 9/2016 | McGrath | B60L 7/26 |
| 2017/0259679 A1* | 9/2017 | Widmer | G05D 1/00 |
| 2017/0361726 A1* | 12/2017 | Widmer | B60L 53/122 |
| 2017/0373544 A1* | 12/2017 | Niizuma | B60L 53/665 |
| 2018/0354383 A1* | 12/2018 | Namou | B60L 53/124 |
| 2020/0290467 A1* | 9/2020 | Gao | H02J 50/90 |

\* cited by examiner

ELECTRIC CHARGING STATIONS WITH DOCKING MANAGEMENT AND METHODS OF USE

FIELD OF THE DISCLOSURE

The disclosure generally relates to electric charging stations, and more particularly to systems and methods for docking management of charging interfaces of charging stations, as well as remediating instances of docking failures through message-based alerts and/or vehicle control.

BACKGROUND

Charging stations for electric vehicles are becoming more ubiquitous. Correspondingly, user inattentiveness or general misuse of electric charging stations is also quite common. In general, a charging station comprises a base station and a charging interface. The charging interface is connected to a charging port of a vehicle and delivers electrical power to the vehicle. After a charging session, the user is required to return the charging interface to a cradle on the base station. User inattentiveness or general misuse may arise when the user does not properly dock the charging interface with the cradle of the base station. These issues can result in damage to the charging interface when exposed to the elements of the ambient environment such as water. Moreover, the charging interface is subject to being run over or otherwise damaged by a vehicle if the charging interface is left on the ground near the base station. Thus, a need exists for systems and methods that remedy these drawbacks.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure is related to intelligent electric charging stations and methods of use. In more detail, example electric charging stations disclosed herein comprise at least a base station and a charging interface. The charging interface is configured to dock with the base station. In some embodiments, the charging interface docks with a cradle of the base station. The electric charging stations disclosed herein are configured to deliver electrical power to an electric vehicle (EV) through coupling of the charging interface with a charging port of the EV. The electric charging stations are configured to detect docking failures, which in some instances include the charging interface not being returned to and secured within the cradle of the base station.

In some embodiments, an example electric charging station employs a logical docking ruleset that allows a controller of the electric charging station to determine if a docking failure has occurred. The docking ruleset(s) applied by an electric charging station are based on the structural configuration of the electric charging station. For example, some electric charging stations of the present disclosure employ proximity-type sensors such as radio-frequency identifier (RFID), near-field communication (NFC), Bluetooth low-energy (BTE), ultrasonic sensing, magnetic field sensing, photo sensing, radar, and so forth, and a combination thereof. These proximity sensors are configured to sense connection or proximity between the charging interface and the cradle of the base station. Various embodiments include docking detection through electrical coupling (e.g., circuit completion) between the charging interface and the cradle of the base station. Some embodiments can utilize the docking ruleset(s) that measure charging interface orientation rather than electrical coupling or proximity.

Illustrative Architecture

Figure 1:
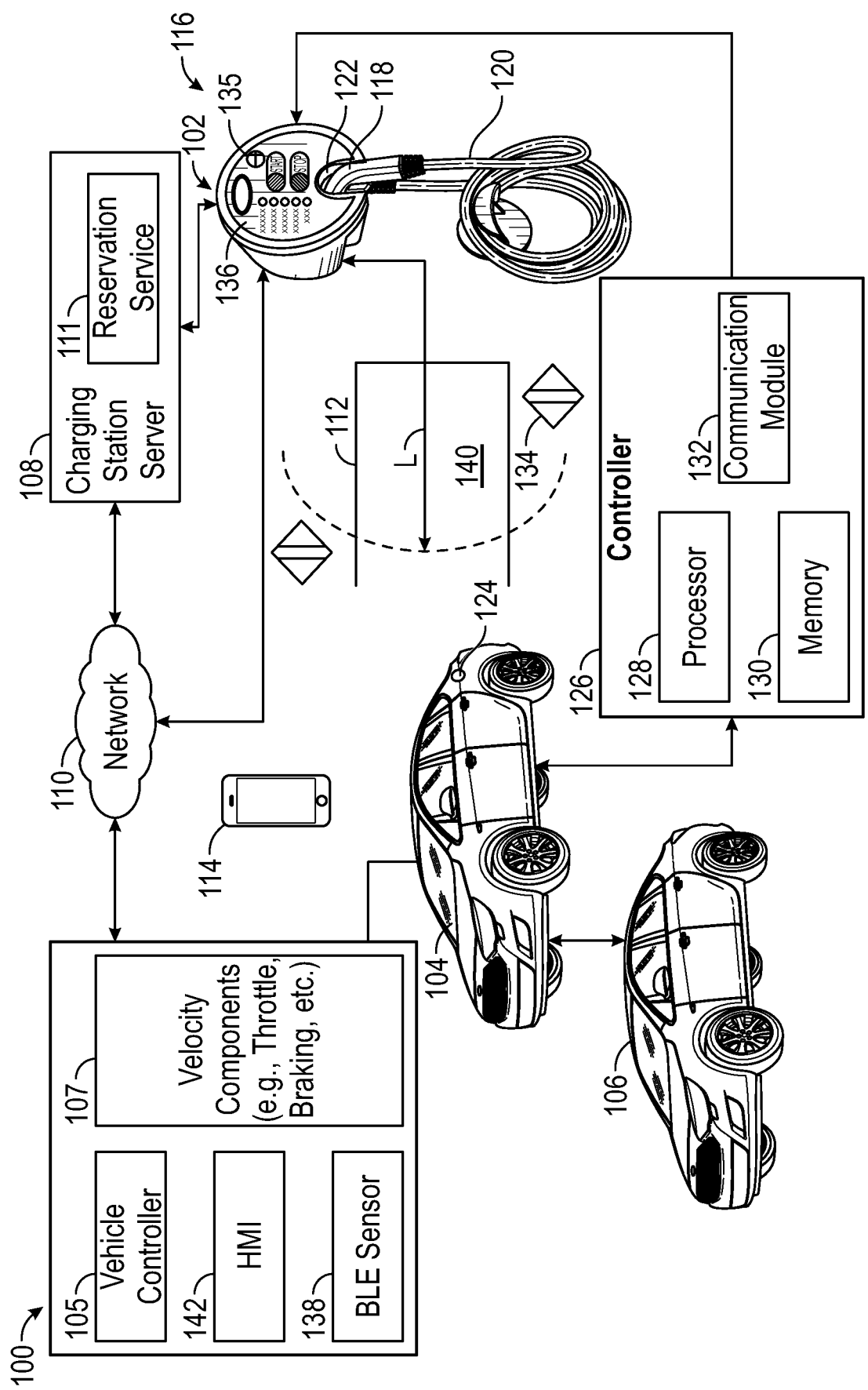
FIG. 1 depicts a generalized architecture for practicing aspects of the present disclosure.

Turning now to the drawings, FIG. 1 depicts an illustrative architecture 100 in which techniques and structures for providing the systems and methods disclosed herein may be implemented. The illustrative architecture 100 may include a charging station 102, one or more electric vehicles such as vehicles 104 and 106, as well as a charging station server 108 and a network 110. In some embodiments, the vehicle 104 comprises a vehicle controller 105. The vehicle controller 105 can be utilized to instruct the vehicle 104 to slow or stop in some embodiments, as will be discussed in greater detail herein.

The network 110 may include any one or a combination of multiple different types of networks, such as cable networks, the Internet, wireless networks, and other private and/or public networks. In some instances, the network 110 may include Bluetooth, cellular, near-field communication (NFC), Wi-Fi, or Wi-Fi direct. In some embodiments, the network 110 includes a device-to-device communication over a short range wireless connection. When more than one vehicle is present, the network 110 can include a mesh network. In some embodiments, the vehicles 104 and 106 can create a mesh network in order to communicate with one another and pass messages. This configuration allows for propagation or pushing of messages from the charging station 102 to vehicles that may or may not be in the range of the charging station 102. For example, if the vehicle 104 is in the range of the charging station 102 but the vehicle 106 is outside of the communication range, the charging station 102 can push a message to the vehicle 104 that is then relayed to the vehicle 106. Additional aspects of charging station-to-vehicle communications are disclosed in more detail infra.

In general, the charging station 102 is configured to provide electrical power to, for example, the vehicle 104. The charging station 102 can be associated with a parking space 112 in a parking lot. In some embodiments, the charging station 102 and the parking space 112 can be reserved using a reservation service 111 implemented by the charging station server 108. In some embodiments, access to the functionalities of the charging station server 108 is provided through an application that can be executed within a console display of the vehicle 104 or through an application residing on a mobile device 114.

In some embodiments, the charging station 102 comprises a base station 116 and a charging interface 118. The charging interface 118 can be electrically coupled to the base station 116 using a cable 120. In various embodiments, the base station 116 comprises a cradle 122 (e.g., receiver). The charging interface 118 is configured to dock within the cradle 122. Thus, a physical configuration (e.g., shape and size) of the cradle 122 is configured to receive and retain the charging interface 118, or at least a portion thereof.

In various embodiments, a terminal end or conductor(s) of the charging interface 118 is configured to couple with a charging port 124 of the vehicle 104. This coupling allows for electrical power to flow from the base station 116 to the charging interface 118 through the cable 120 and into the vehicle 104. The electrical power is stored in one or more rechargeable batteries of the vehicle 104 as would be appreciated by one of ordinary skill in the art.

In accordance with the present disclosure, the charging station 102 can comprise a controller 126. The controller 126 comprises a processor 128 and a memory 130. The memory 130 stores executable instructions that are executable by the processor 128 to perform various functions related to the operations of the charging station 102. According to some embodiments, the executable instructions include logic executed by the processor 128 that is used to detect docking of the charging interface 118 with the cradle 122. More specifically, in addition to being able to detect docking of the charging interface 118 with the cradle 122, the processor 128 is also used to detect docking failures. In general, a docking failure is any condition where the charging interface 118 is not successfully returned to the cradle 122 after the charging interface 118 has been used or otherwise removed from the base station 116.

For example, if an end user removes the charging interface 118 from the cradle 122 and fails to place the charging interface 118 back into the cradle 122, a docking failure has occurred. Note that the charging station 102 of FIG. 1 is illustrated in a docked configuration with the charging interface 118 successfully returned to the cradle 122. A docking failure can include any instance in which the charging interface 118 decouples from the cradle 122 of the base station 116 without being successfully returned. As will be described in greater detail herein, docking failures can occur for any number of reasons. Docking failures can also be detected using a variety of measures as will be discussed in greater detail infra.

In one or more embodiments, the controller 126 is located in the base station 116. In other embodiments, the controller 126 is located in the charging interface 118. The following sections describe a plurality of embodiments, each comprising a unique combination of structural components and corresponding docking assessment capabilities.

In general, the controller 126 can be configured to detect when the charging interface 118 has been connected to a charging port of a vehicle. This can occur when the controller 126 senses electrical power flowing from the base station 116 to the charging interface 118 or when a circuit is completed between the base station 116 and the charging port 124 of the vehicle 104. Thus, the controller 126 can also sense a disconnection between the charging interface 118 and the charging port 124 of a vehicle 104 when the power flow ceases. This disconnection can be used as a trigger for counting time durations (e.g., specified periods of time) during which the charging interface 118 should be returned to the base station 116.

Also, the controller 126 is generally configured to apply at least one docking ruleset to determine when a docking failure occurs between the charging interface 118 and the cradle 122 of the base station 116. In some embodiments, the controller 126 is generally configured to execute at least one remediating action in response to the docking failure. Broadly, a remediating action can include aspects such as alert message broadcasting and/or vehicle control.

Figure 2A:
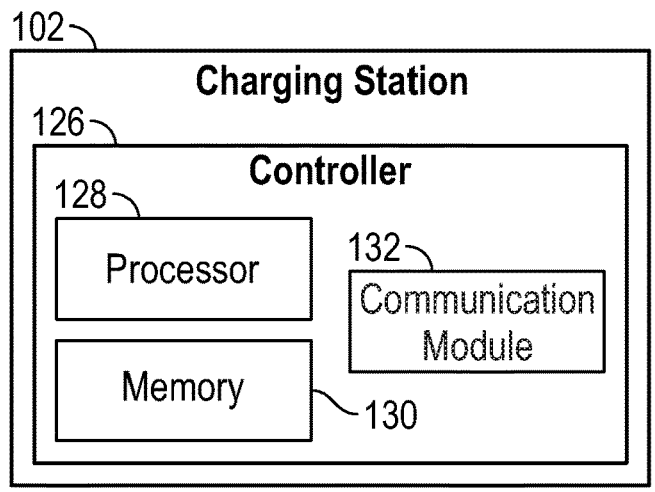
FIGS. 2A and 2B collectively and schematically illustrate an example embodiment of the charging station that is constructed in accordance with the present disclosure and adapted to use a circuit to detect docking events including successful dockings and docking failures.
Figure 2B:
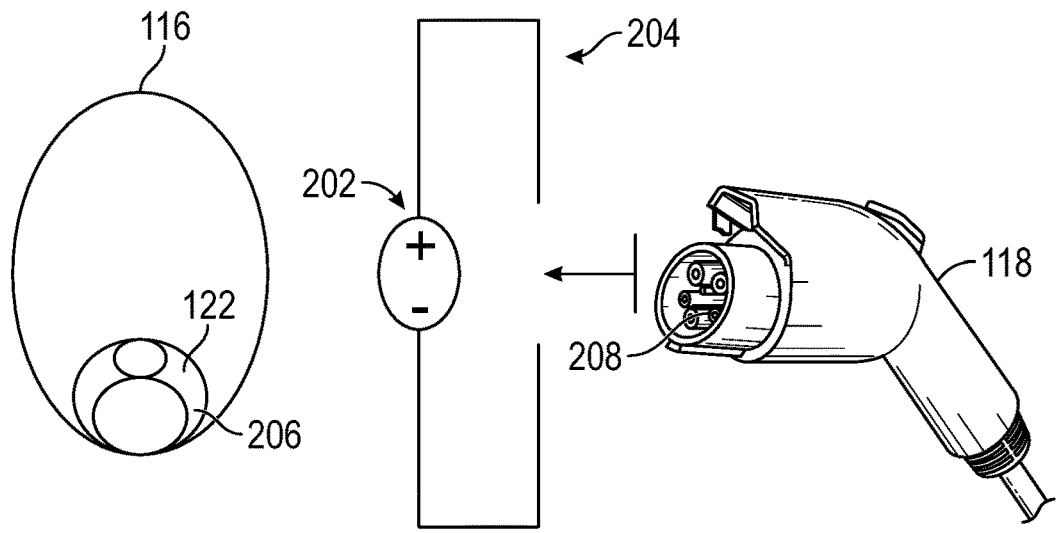
Figure 2B:
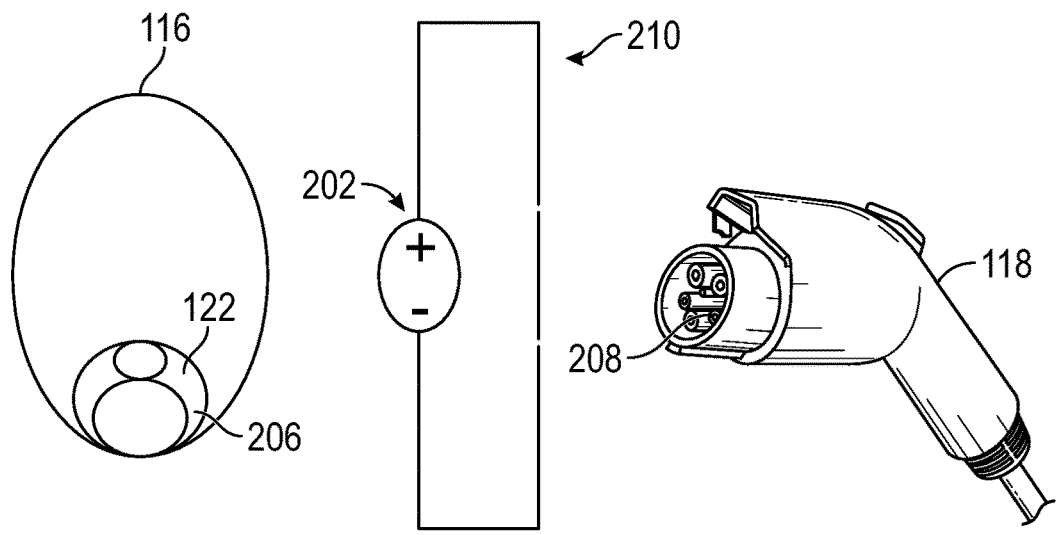

FIGS. 2A and 2B collectively and schematically illustrate an example embodiment of the charging station 102 that is constructed in accordance with the present disclosure and adapted to use a circuit to detect docking events including successful dockings and docking failures. In more detail, the charging station 102, and specifically the controller 126, is adapted to sense docking failures using a circuit 202. In sum, when the circuit 202 is complete, it is indicative of the charging interface 118 being successfully coupled with the cradle 122 of the base station 116. In some embodiments, the circuit 202 can comprise any equivalent circuit that creates a completed circuit loop when the charging interface 118 is successfully coupled with the cradle 122 of the base station 116. In some embodiments, a "completed circuit loop" can be used. When the charging interface 118 is successfully coupled with the cradle 122 of the base station 116 such a configuration will complete the circuit 202, and the controller 126 will register the charging interface 118 as docked.

Structurally, the circuit 202 can be comprised of a first portion located in the base station 116, which could include female conductors 206 of the cradle 122. Corresponding male conductors 208 are present in a terminal end of the charging interface 118. When the male conductors 208 of the charging interface 118 electrically couple with the female conductors 206 of the cradle 122, the docking is complete. In some instances, even when the charging interface 118 is docked with the cradle 122, the docking may not be secure. For example, the charging interface 118 may fall out of the cradle 122. Thus, the docking ruleset may indicate that the charging interface 118 has not successfully docked with the base station 116 until the charging interface 118 has created a completed circuit loop with the cradle 122 for a period of time. In one example, this time frame includes at least 30 seconds, although other time periods are likewise contemplated for use.

The controller 126 can implement a docking ruleset when the circuit 202 is used in the charging station 102. Part of the docking ruleset involves not only the circuit completion as a condition, but also an aspect of time as another condition. In some embodiments, when the charging interface 118 is unplugged from either a vehicle or the base station, there is an expected window of time in which the charging interface 118 will be expected to be replaced at the base station 116 (e.g., circuit completed).

Thus, an example failed circuit rule can be implemented by the controller 126 that specifies that a docking failure occurs when a complete circuit is not created between the charging interface 118 and the cradle 122 of the base station 116 within a specified period of time after the charging interface 118 has been removed from a charging port of a vehicle (or alternatively from the cradle 122 of the base station 116). To be sure, while the aspect of disconnection can be used to measure an expected time frame for docking, the disconnect event can be measured from either when the charging interface 118 is disconnected from a vehicle or when the charging interface 118 is disconnected from the base station 116. The expected docking time related to a disconnect event from a vehicle might be shorter than an expected docking time related to a disconnect event from the base station 116. A docking ruleset specifying disconnect events relative to the base station 116 are advantageous when the end user fails to use the charging interface 118. For example, the end user removes the charging interface 118, but inadvertently forgets to connect it to his/her vehicle. Thus, the time frame reference in a docking ruleset can include a failure to connect the charging interface 118 to a vehicle and also a failure to return the charging interface 118 to the base station 116.

In sum, a specified period of time can include any of a specified period of time after the charging interface has been removed from the charging port of the vehicle or a specified period of time after the charging interface has been removed from the cradle of the base station, or combinations thereof.

In one embodiment, the expected time frame for docking includes 30 seconds from when the charging interface 118 is disconnected from a vehicle. In another example, the expected time frame for docking includes one minute from when the charging interface 118 is disconnected from the cradle 122 of the base station 116, but is never intermediately connected to a vehicle or returned to the cradle 122 of the base station 116.

For purposes of context, an open configuration 204 of the circuit 202 exists when the charging interface 118 is disconnected from the base station 116. A closed configuration 210 exists when the charging interface 118 is successfully connected with the base station 116. An example of the charging interface 118 being physically coupled to the base station 116 is illustrated in FIG. 1.

Figure 3A:
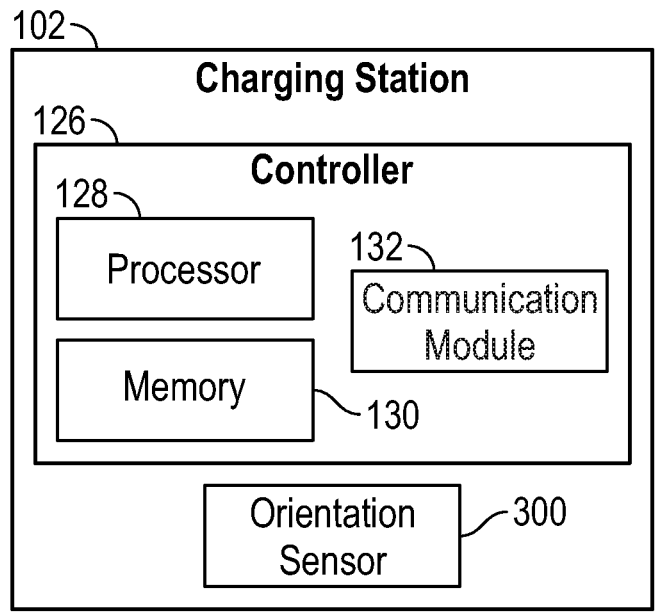
FIGS. 3A and 3B collectively illustrate another embodiment of the charging station that is constructed in accordance with the present disclosure and adapted to utilize an orientation sensor to detect docking events including successful dockings and docking failures.
Figure 3B:
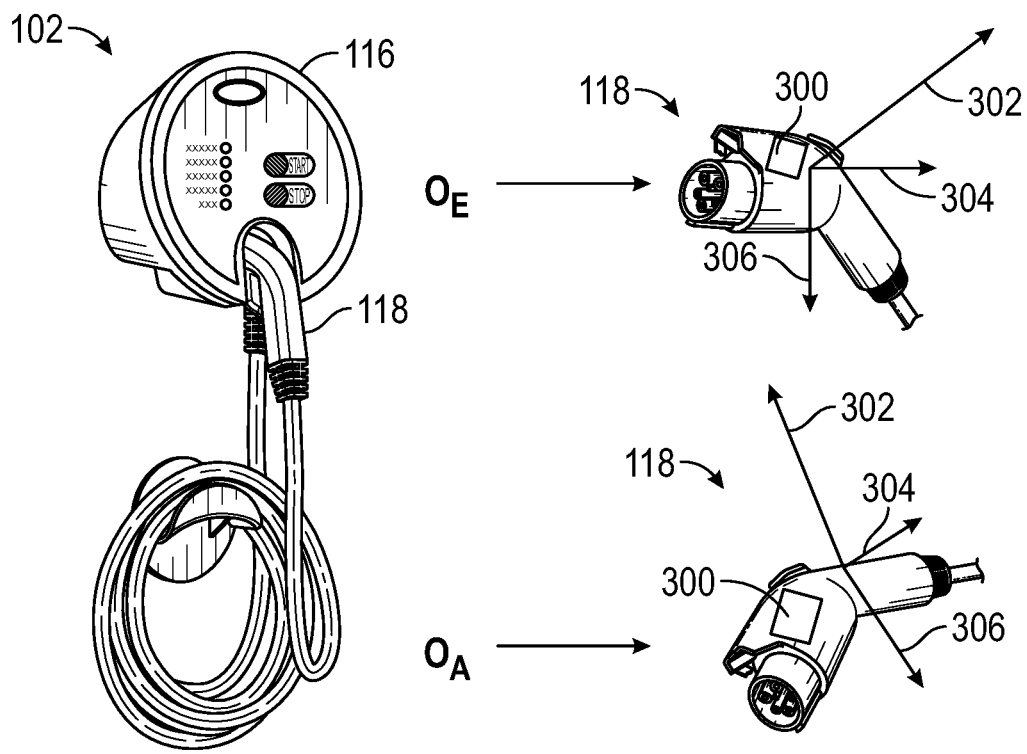

FIGS. 3A and 3B collectively illustrate another embodiment of the charging station 102 that is constructed in accordance with the present disclosure and adapted to utilize an orientation sensor to detect docking events including successful dockings and docking failures.

In more detail, the charging station 102, and specifically the controller 126, is adapted to sense docking failures using an orientation sensor 300. In some embodiments, the orientation sensor 300 is associated with the charging interface 118. According to some embodiments, the orientation sensor 300 comprises a MEMS (micro-electro-mechanical systems) gyroscope associated with the charging interface 118 that determines an orientation of the charging interface 118. In some embodiments, the orientation sensor 300 can sense orientation through three axes including a pitch axis 302, a roll axis 304, and a yaw axis 306. The controller 126 can establish a baseline orientation for the charging interface 118 by measuring an orientation of the charging interface 118 when it is docked with the base station 116. An example baseline or expected charging interface orientation $O_E$ is illustrated in FIG. 3B. The controller 126 can store axis values for the expected charging interface orientation $O_E$ in the memory 130.

During operation, the controller 126 implements a docking ruleset that comprises a failed orientation rule. In some embodiments, the failed orientation rule specifies that a docking failure occurs when the charging interface 118 has not achieved the expected charging interface orientation $O_E$ within a specified period of time after the charging interface 118 has been removed from a charging port of a vehicle. As noted above, the docking can also be measured from removal of the charging interface 118 from the cradle 122 of the base station 116 as well. Thus, after the specified period of time has elapsed, the controller 126 obtains multi-axis measurements from the orientation sensor 300, which are referred to as an actual charging interface orientation $O_A$. These measurements refer to the roll, pitch, and yaw axis values obtained after the specified period of time has elapsed. In some embodiments, the proper orientation of the charging interface 118 should be held for a period of time before the controller 126 indicates that the charging interface 118 has successfully docked. Stated otherwise, this specified period of time includes a time frame for which the expected charging interface orientation is maintained by the charging interface. In one example, the specified period of time could include the charging interface 118 maintaining its actual charging interface orientation $O_A$ in correspondence with the expected charging interface orientation $O_E$ for at least 15 seconds. Again, other example time frames can be utilized.

Deviations between the actual charging interface orientation $O_A$ and the expected charging interface orientation $O_E$ are indicative of a docking failure. That is, when the actual charging interface orientation $O_A$ does not substantially match the expected charging interface orientation $O_E$, the controller 126 can indicate that a docking failure has occurred. The allowable degree of difference between the expected charging interface orientation $O_E$ and the actual charging interface orientation $O_A$ is part of the docking ruleset for this embodiment.

Other additional embodiments as disclosed below generally rely on proximity sensing as a means for detecting docking events such as successful docking events and/or docking failures. Examples of proximity sensing include, but are not limited to, Bluetooth low-energy, radio-frequency identification (RFID), or near-field communication (NFC), and/or combinations thereof.

Figure 4A:
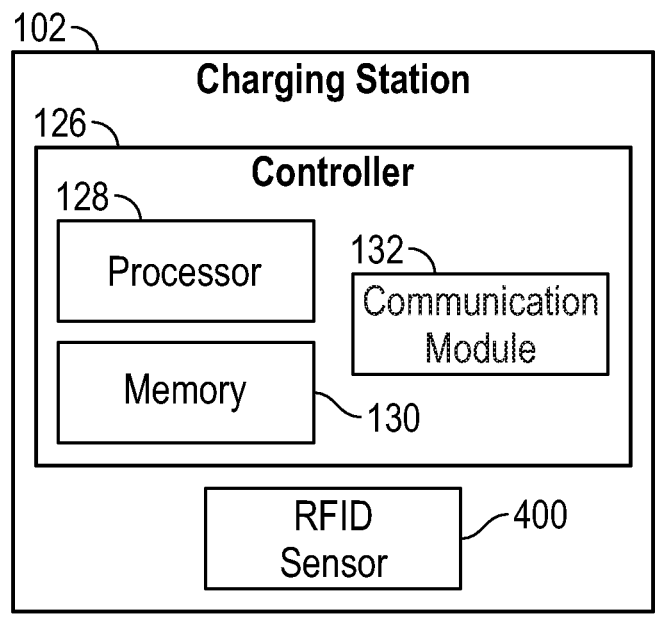
FIGS. 4A and 4B collectively illustrate another embodiment of the charging station that is constructed in accordance with the present disclosure and adapted to utilize a radio-frequency identification (RFID) sensor to detect docking events including successful dockings and docking failures FIGS. 5A and 5B collectively illustrate another embodiment of the charging station that is constructed in accordance with the present disclosure and adapted to utilize a Bluetooth low energy (BLE) sensor to detect docking events including successful dockings and docking failures.
Figure 4B:
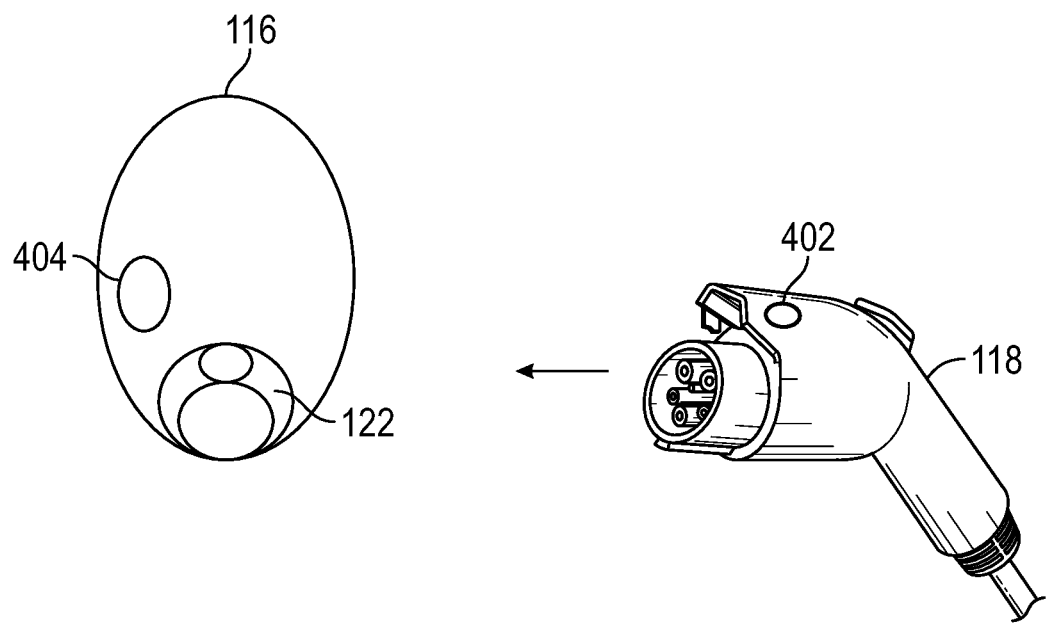

FIGS. 4A and 4B collectively illustrate another embodiment of the charging station 102 that is constructed in accordance with the present disclosure and adapted to utilize a radio-frequency identification (RFID) sensor to detect docking events including successful dockings and docking failures.

In more detail, the charging station 102, and specifically the controller 126, is adapted to sense docking failures using an RFID sensor 400. In some embodiments, the RFID sensor 400 is structurally comprised of two components that function in combination with the controller 126. In some embodiments, the RFID sensor 400 comprises at least a tag or transponder 402 and an antenna 404. In the illustrated embodiment, the tag or transponder 402 is associated with the charging interface 118, and the antenna 404 is associated with the base station 116. It will be understood that the location of the components of the RFID sensor 400 can be switched in some embodiments.

In general, the controller 126 functions as a reader or interrogator controlling the antenna 404. In some embodiments, the tag or transponder 402 functions passively and only emits signals when activated by radio-frequency emissions from the antenna 404. Thus, the controller 126 activates the antenna 404 when the charging interface 118 is removed from the base station 116. When the charging interface 118 is docked with the base station 116, the tag or transponder 402 associated with the charging interface 118 is necessarily brought into close proximity with the antenna 404. The proximity of the tag or transponder 402 to the antenna 404 activates the tag or transponder 402 to emit a signal that is then received by the antenna 404 and interpreted by the controller 126 as a docking event.

Conversely, the controller 126 is also configured to implement a docking ruleset that includes a failed short range wireless connection rule. The failed short range wireless connection rule specifies that a docking failure occurs when a short range wireless connection has not been established between the short range wireless receiver and the short range wireless transmitter within a specified period of time. In this example, the tag or transponder 402 is the short range wireless transmitter and the antenna 404 is the short range wireless receiver. In some embodiments, the elements (e.g., tag and antenna) are transceivers rather than transmitters or receivers allowing both transmission and receipt of signals.

In an example use case, a docking failure is detected by the controller 126 when the tag or transponder 402 is not brought into proximity with the antenna 404 within 30 seconds of the charging interface 118 being removed from a charging port of a vehicle.

Figure 5A:
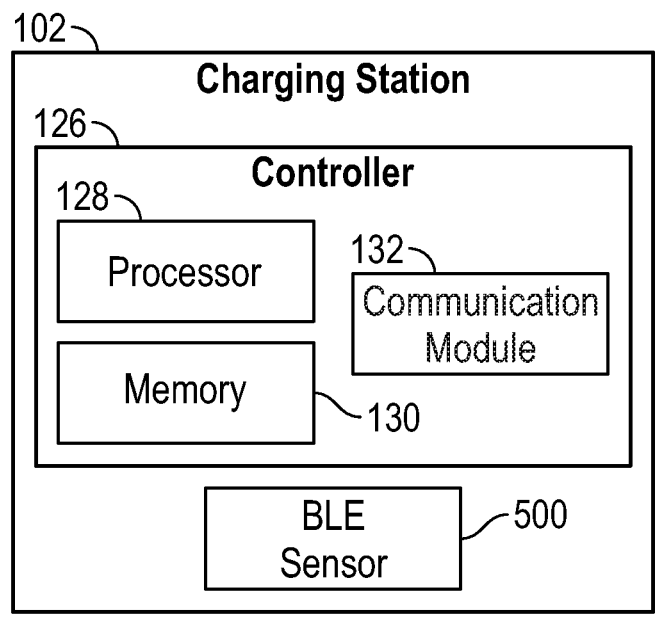
Figure 5B:
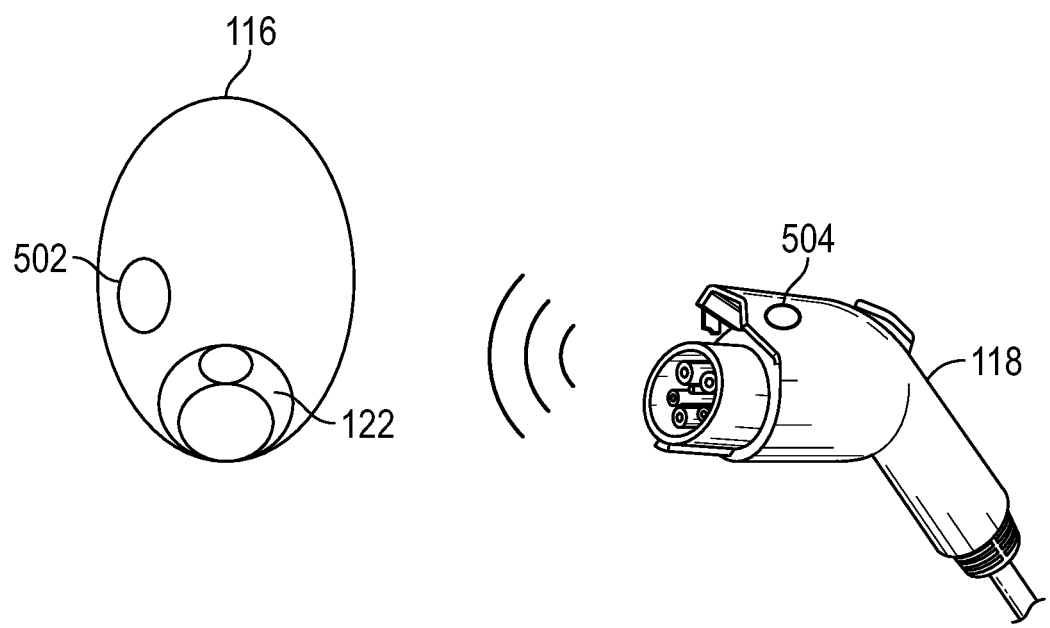

FIGS. 5A and 5B collectively illustrate another embodiment of the charging station 102 that is constructed in accordance with the present disclosure and adapted to utilize a Bluetooth low energy (BLE) sensor to detect docking events including successful dockings and docking failures.

In more detail, the charging station 102, and specifically the controller 126, is adapted to sense docking failures using a BLE sensor 500. In some embodiments, the BLE sensor 500 is structurally comprised of two components that function in combination with the controller 126. In some embodiments, the BLE sensor 500 comprises at least a base station BLE chipset 502 and a charging interface BLE chipset 504.

In general, the controller 126 receives signals from the base station BLE chipset 502. When the charging interface 118 is docked with the base station 116, the charging interface BLE chipset 504 is brought into proximity with the base station BLE chipset 502. The controller 126 can read and interpret a signal strength of a signal generated between the base station BLE chipset 502 and the charging interface BLE chipset 504. The controller 126 stores signal strength values and utilizes an expected signal strength as a comparison. When an actual signal strength is approximately equal to the expected signal strength, the controller 126 registers this as a docking event. The docking event is determined to be successful if this relationship is created within a specific period of time, such as 15 seconds or 30 seconds after the charging interface 118 has been removed from a charging port of a vehicle. The docking event can be further conditioned on maintaining signal strength for a specific period of time, such as 15 seconds or 30 seconds. Again, this specific period of time is selectable and can be varied according to design requirements.

Conversely, the controller 126 is also configured to implement a docking ruleset that includes a failed short range wireless connection rule. The failed short range wireless connection rule specifies that a docking failure occurs when a short range wireless connection has not been established between the short range wireless receiver and the short range wireless transmitter within a specified period of time. In this example, the charging interface BLE chipset 504 is the short range wireless transmitter, and the base station BLE chipset 502 is the short range wireless receiver. Again, these roles can be reversed as desired.

In an example use case, a docking failure is detected by the controller 126 when a magnitude of a signal created by the base station BLE chipset 502 and the charging interface BLE chipset 504 is not sufficient. Moreover, the docking failure can be further conditioned by a time frame. Thus, a docking failure exists when a magnitude of a signal created by the base station BLE chipset 502 and the charging interface BLE chipset 504 is not achieved within at least 30 seconds of the charging interface 118 being removed from a charging port of a vehicle.

Figure 6A:
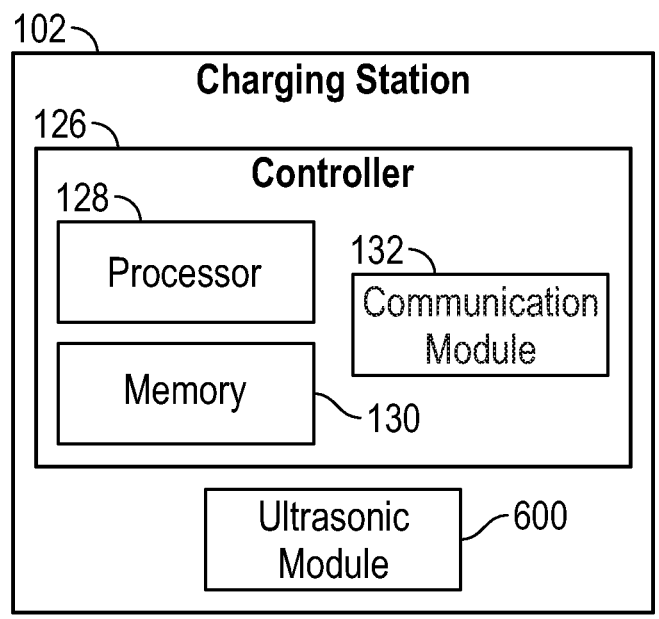
FIGS. 6A and 6B collectively illustrate another embodiment of the charging station that is constructed in accordance with the present disclosure and adapted to utilize an ultrasonic module to detect docking events including successful dockings and docking failures.
Figure 6B:
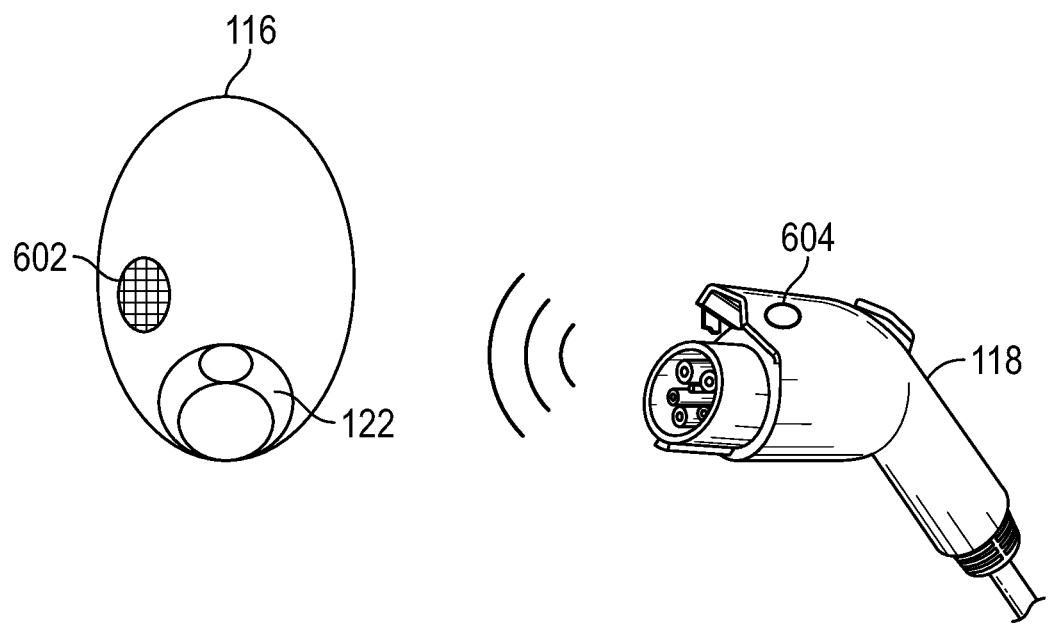

FIGS. 6A and 6B collectively illustrate another embodiment of the charging station 102 that is constructed in accordance with the present disclosure and adapted to utilize an ultrasonic module to detect docking events including successful dockings and docking failures.

In more detail, the charging station 102, and specifically the controller 126, is adapted to sense docking failures using an ultrasonic module 600. The ultrasonic module 600 comprises a receiver such as a microphone 602 associated with the base station 116 and a transmitter such as a speaker 604 associated with the charging interface 118. Again, these components can be switched with respect to their locations.

In some embodiments, the controller 126 is configured to cause the speaker 604 associated with the charging interface 118 to emit an ultrasonic ping when the charging interface 118 is removed from the base station 116 or alternatively when the charging interface 118 is removed from a charging port of a vehicle.

The controller 126 is also configured to receive and interpret signals from the microphone 602 associated with the base station 116. When the charging interface 118 is docked with the base station 116, the speaker 604 is brought into proximity with the microphone 602. A distance between the microphone 602 and the speaker 604 is measured based on a time calculated between when ultrasonic pings are emitted from the speaker 604 and are received by the microphone 602. The charging interface 118 is successfully docked with the base station 116 when a distance between the speaker 604 and the microphone 602 is less than a critical distance threshold.

Conversely, the controller 126 is also configured to implement a docking ruleset that includes a failed ultrasonic signal rule. The failed ultrasonic signal rule specifies that if a distance between the speaker 604 and the microphone 602 is more than a critical distance threshold such as a centimeter for example, the charging interface 118 is not successfully docked with the base station 116. The distance between the speaker 604 and the microphone 602 is indicative of a distance between the charging interface 118 and the base station 116. Moreover, this distance measurement can be determined within a specified period of time after the charging interface 118 has been disconnected from a charging port of a vehicle.

Figure 7A:
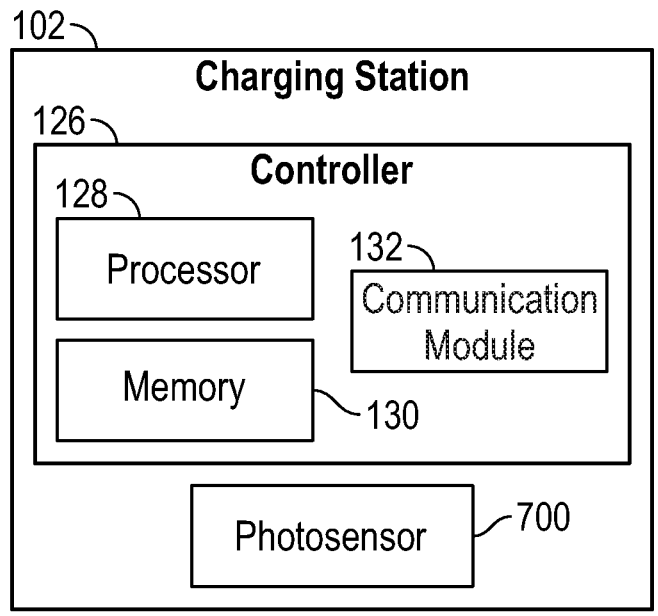
FIGS. 7A and 7B collectively illustrate another embodiment of the charging station that is constructed in accordance with the present disclosure and adapted to utilize a photosensor to detect docking events including successful dockings and docking failures.
Figure 7B:
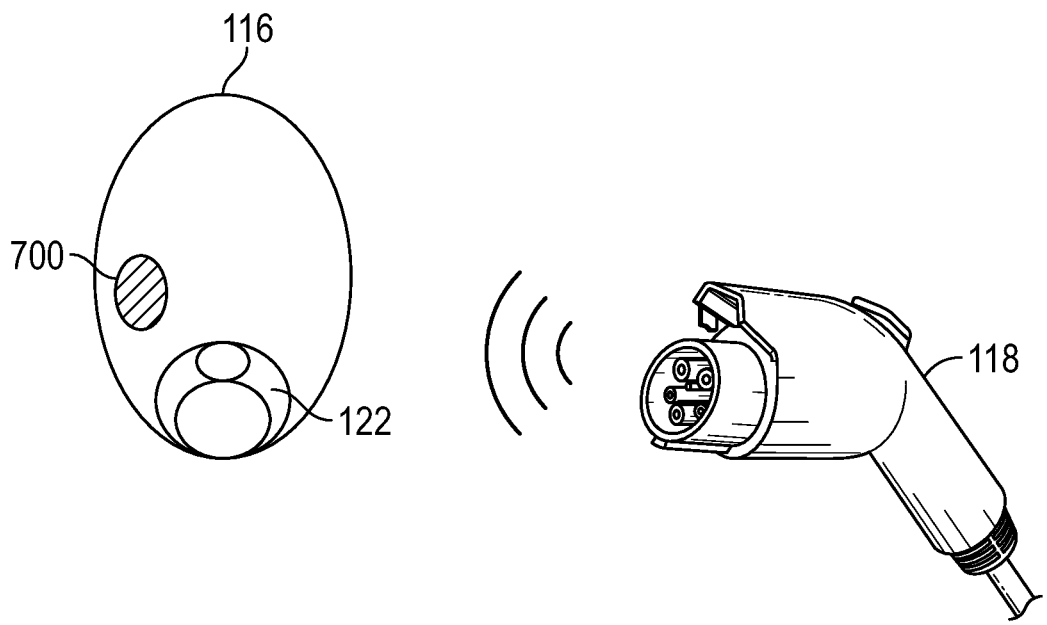

FIGS. 7A and 7B collectively illustrate another embodiment of the charging station 102 that is constructed in accordance with the present disclosure and adapted to utilize a photosensor to detect docking events including successful dockings and docking failures.

In more detail, the charging station 102, and specifically the controller 126, is adapted to sense docking failures using a photosensor 700. The photosensor 700 is disposed in either the base station 116 or the charging interface 118. When the charging interface 118 is successfully docked with the base station 116, the photosensor 700 is occluded so as to prevent ambient light to enter the photosensor 700. Conversely, when the charging interface 118 is removed from the base station 116, ambient light can enter the photosensor 700.

In this embodiment, the docking ruleset applied by the controller 126 comprises a failed photosensor rule. In some embodiments, this rule specifies that a docking failure occurs when light is sensed by the photosensor 700 after a specified period of time after the charging interface 118 has been removed from the base station 116 or the charging port of a vehicle.

While some embodiments contemplate the photosensor 700 being used to sense ambient light, other embodiments can include a photosensor comprised of both a photo emitter and a photo receiver, which can function in an infrared spectrum or frequency of light. In an example embodiment, the photo emitter is associated with the base station 116, and the photo receiver is associated with the charging interface 118. A distance between the base station 116 and the charging interface 118 is calculated indirectly by measuring a receipt time for pulses of infrared light between the photo emitter and the photo receiver. The distance calculation functionality can be performed by the controller 126 through specific-purpose programming. The controller 126 can control when the photo emitter transmits infrared pulses and can receive signals from the photo receiver when those pulses are received and calculate a time elapsed therebetween. It will be understood that this elapsed time is indicative of distance.

In one or more embodiments, the photosensor 700 can be replaced with a magnetic field detector. The magnetic field detector can be associated with the base station 116. A magnet is associated with the charging interface 118. When the charging interface 118 is docked with the base station 116, the magnetic field detector will detect a magnetic field produced by the magnet. The controller 126 can receive magnetic field signals from the magnetic field detector and detect docking successes and failures.

Referring briefly back to FIG. 1, regardless of the component or components used to detect docking events, when the controller 126 determines that a docking failure has occurred through the use of docking rulesets, the controller 126 of the charging station 102 can execute one or more remediating actions. These remediating actions can include transmission of alert or warning messages, as well as indirect control of vehicle behaviors. These functions are performed through the use of a communication module 132 of the charging station 102. The communication module 132 allows the charging station to communicate with, for example, the vehicle, the charging station server 108, or the mobile device 114 over the network 110. The communication module 132 can include any wired or wireless connection that would be known to one of ordinary skill in the art. In some embodiments, the communication module 132 is used to transmit signals or messages over the network 110 to various end points such as vehicles, mobile devices, and so forth.

According to embodiments of the present disclosure, when a docking failure is detected, the controller 126 can broadcast a warning signal that can be received by any device within broadcast range of the communication module 132. The transmission of warning signals or messages is one example of a remediating action that can be executed by the charging stations of the present disclosure.

For example, the controller 126 can broadcast a message that informs the vehicle 104 that the charging interface 118 has not been docked and that parking at the parking space 112 is prohibited. Thus, the controller 126 is adapted to generate messages that are capable of being displayed by the vehicle 104. An example warning message is illustrated in FIG. 8 as described below.

In addition to (or in lieu of) broadcasting a warning signal, the controller 126 is configured to cause a speaker 135 of the charging station 102 to emit a warning tone. The controller 126 is configured to cause lights on a panel 136 of the charging station 102 to blink.

Figure 8:
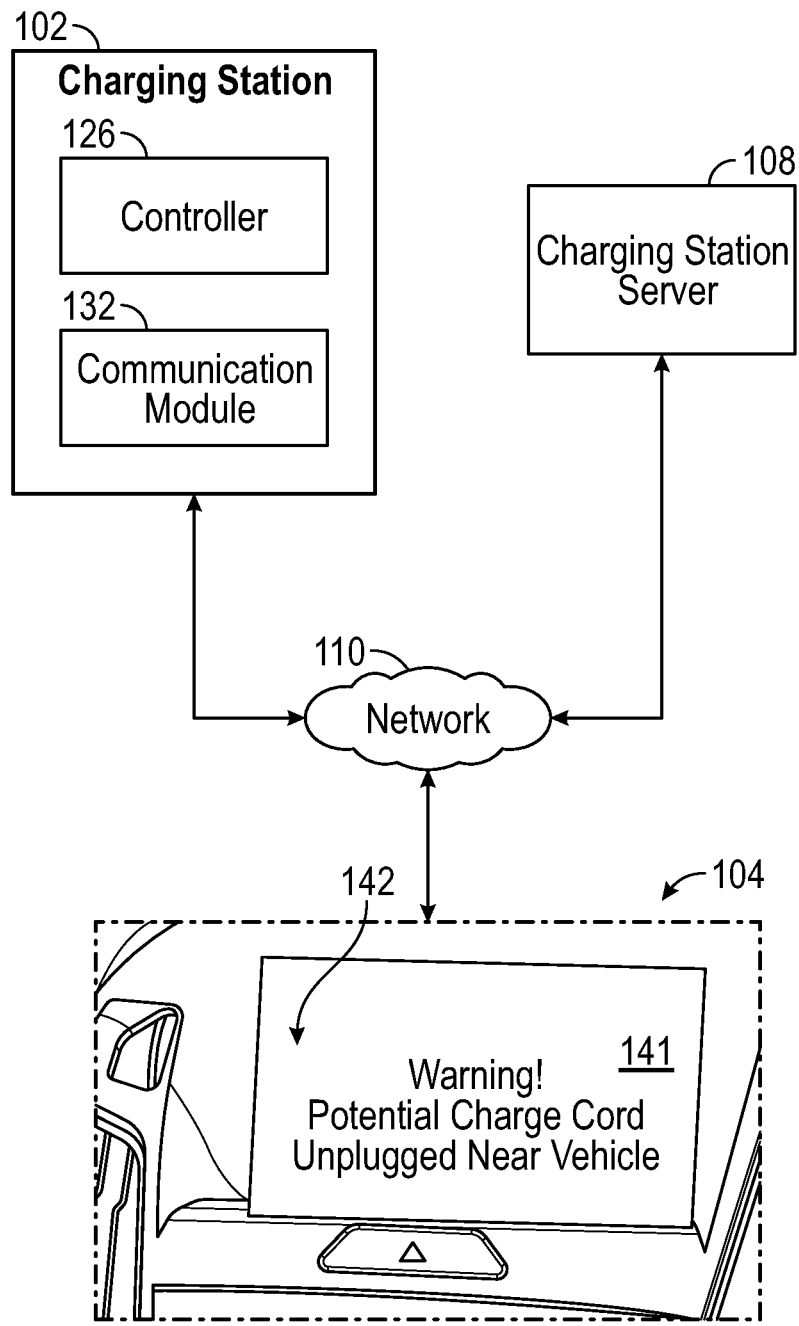
FIG. 8 illustrates the provision of an alert message on a human machine interface of a vehicle.

Referring to FIG. 8, in some embodiments, either the controller 126 and/or the charging station server 108 can utilize global positioning system (GPS) coordinates of the vehicle 104 and push warning messages to those vehicles. An alert can be sent to a human machine interface (HMI 142) of the vehicle 104. In some embodiments, this communication is performed over a cellular network using a low latency link using the communication module 132. In some embodiments, if the vehicle 104 is equipped with a telematic control unit (TCU), the vehicle 104 can receive the alert 141 in real-time for display on the HMI 142. The HMI 142 can also emit an audible tone in addition to displaying the alert 141.

The above examples contemplate the general distribution of warning or alert messages to devices such as vehicles and/or mobile devices. The following examples and embodiments relate to specific targeting of vehicles that may enter an area around the charging station 102. These embodiments utilize vehicle proximity sensing to identify when vehicles are approaching the charging station 102 when a docking failure has occurred with respect to the charging station 102.

Referring back to FIG. 1, the charging station 102 communicates with one or more vehicle proximity sensors 134 that are located with the charging station 102 or are within the vicinity of the charging station 102 and in communication with the charging station 102 over the network 110.

In one embodiment, the one or more vehicle proximity sensors 134 comprise radar sensors that are directed to an area (such as parking space 112) around the charging station 102. An area of interest (referred to as a restricted area) includes any location that the charging interface 118 may be laying when not docked with the base station 116. This can be defined by a length L of the cable 120 plus an extra amount of length that creates a buffer zone around the charging interface 118. An example restricted area 140 is illustrated in dotted line around the parking space 112. The controller 126 is configured to receive signals from the radar sensors and determine if the vehicle 104 is approaching.

In another embodiment, the one or more vehicle proximity sensors 134 comprise ultrasonic sensors that are directed to an area (such as parking space 112) around the charging station 102. The ultrasonic sensors emit pings and listen for echoes which match the profile of the vehicle 104.

In yet another embodiment, the one or more vehicle proximity sensors 134 comprise a camera that obtains images in and around an area (such as parking space 112) around the charging station 102. In some embodiments, the controller 126 is configured to implement object recognition functionalities. The controller 126 is thus configured to detect any combination of vehicle presence, velocity, and direction of travel.

Rather than utilizing external vehicle proximity sensors, the proximity of a vehicle can be sensed using BLE. For example, as with the embodiment of FIGS. 5A and 5B, the vehicle 104 can include a BLE sensor 138 that communicates with the charging interface BLE chipset 504 (see FIG. 5B). When the BLE sensor 138 receives a signal from the charging interface BLE chipset 504, the vehicle 104 is determined to be in proximity to the charging interface 118. In yet other embodiments, the charging station 102 can communicate with the vehicle using dedicated short-range communications (DSRC) or another communication protocol such as C-V2X (Cellular V2X).

In addition to the transmission of warning messages or alerts, the charging stations disclosed herein can also cause indirect control or operation of a vehicle that is determined to be approaching or is within the restricted area 140. As noted above, the vehicle 104 comprises a vehicle controller 105 that is used to control vehicle operations such as velocity and braking. In some embodiments, the controller 126 of the charging station 102 is configured to communicate with the vehicle controller 105 of the vehicle 104 through the network 110 to slow or stop the vehicle 104 if the controller 126 of the charging station 102 detects that the vehicle 104 is entering or about to enter the restricted area 140. The vehicle controller 105 at least comprises a processor and a memory that allow the vehicle controller 105 to control aspects of any of the throttle input, engine, transmission, and/or braking systems of the vehicle 104 to cause the vehicle 104 to slow down or stop. These elements are generally illustrated as velocity components 107.

Thus, in sum, the controller 126 of the charging station 102 is configured to receive proximity signals from an associated proximity sensor that are indicative of a vehicle approaching the charging station. This operation occurs after determining that a docking failure has occurred. Next, the controller 126 of the charging station 102 can transmit a warning signal to the approaching vehicle that indicates that the docking failure has occurred, as well as cause a vehicle controller of the approaching vehicle to slow or stop when the vehicle enters a restricted area around the system during the docking failure.

In some instances, the charging station server 108 is configured to provide a reservation service where an end user can reserve a charging station for future or current use. The reservation service can reassign the vehicle 104 to a different parking space than the parking space 112 when the controller 126 has determined that a docking failure has occurred. This reassignment can occur in response to the controller 126 sensing that the vehicle is approaching or when a time assigned to the vehicle is nearing.

Thus, in some embodiments, when the controller 126 determines that a vehicle is approaching a parking space 112 or the restricted area 140 after a docking failure has been identified, the controller 126 can transmit a signal to a reservation service to assign the vehicle 104 to a different parking space. The reservation service implemented by the charging station server 108 can update the reservation by reassigning the vehicle 104 to a new parking space.

Illustrative Methods and Operations

Figure 9:
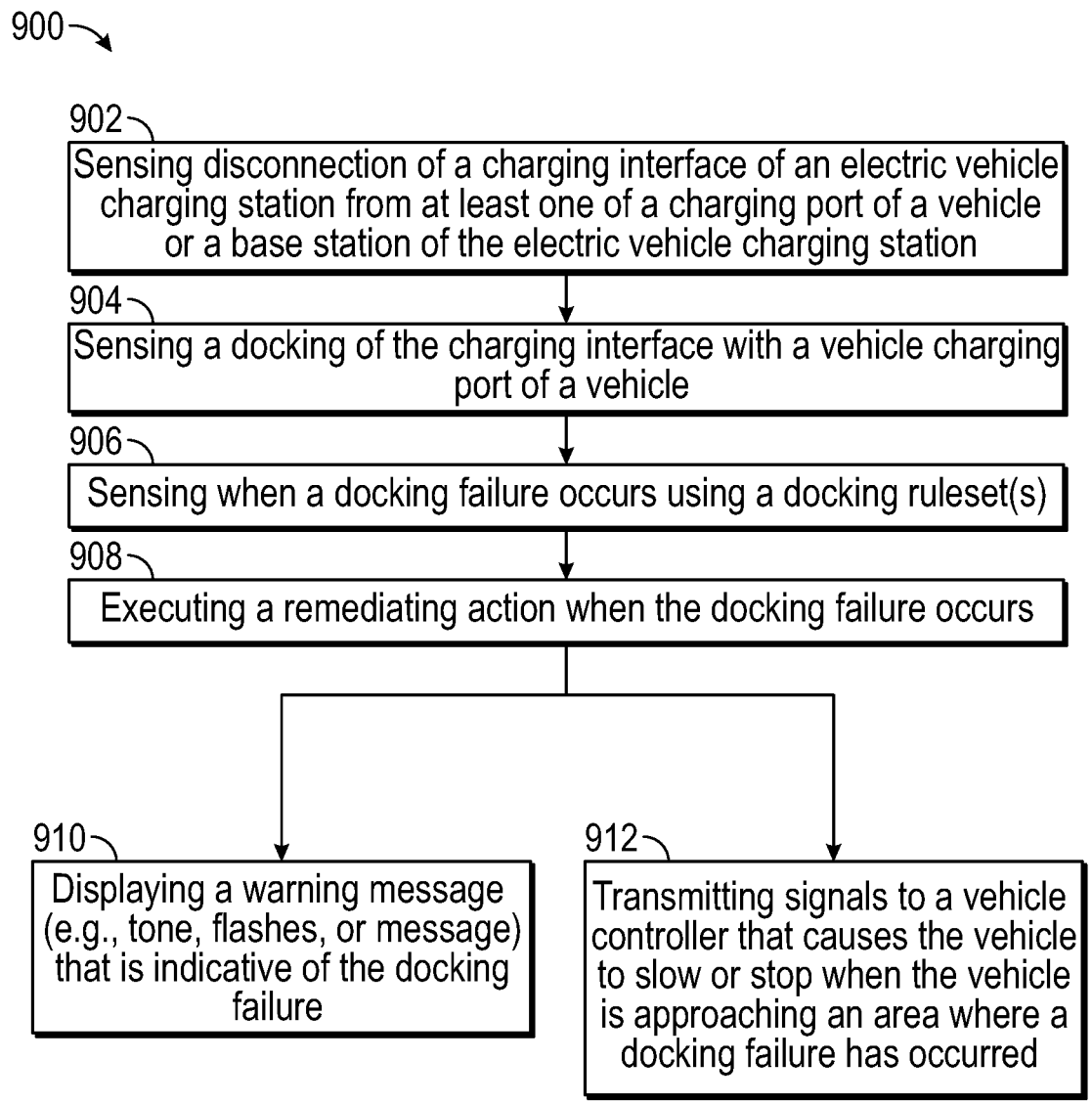
FIG. 9 is a flowchart of an example method of the present disclosure.

FIG. 9 is a flowchart of an example method of the present disclosure. In some embodiments, the method includes a step 902 of sensing disconnection of a charging interface of an electric vehicle charging station from at least one of a charging port of a vehicle or a base station of the electric vehicle charging station. As noted above, this can include sensing when electrical power is no longer flowing from the charging station to the vehicle or sensing when the charging interface is no longer in association with the base station (and specifically a cradle of the base station). This can occur through any of the numerous embodiments described above in the systems of FIGS. 1-8.

In some embodiments, the method includes a step 904 of sensing a docking of the charging interface with a vehicle charging port of a vehicle, as well as a step 906 of sensing when a docking failure occurs. As noted above, the docking failure includes instances where docking of the charging interface with the base station has not occurred within a specified period of time after a disconnection has been sensed. The docking failure is determined relative to one or more docking rulesets. The docking rulesets are selected based on the capabilities of the charging station. For example, if the charging station is equipped with BLE sensors, the docking rulesets will be tailored to BLE sensor input/output.

In general, the docking failure can occur when any of the following occurs: an orientation of the charging interface measured over a period of time, failure to complete a circuit between the charging interface and the base station during docking, and/or proximity of the charging interface to the base station.

According to some embodiments, the method can also include a step 908 of executing a remediating action when the docking failure occurs. In some embodiments, the remediating action comprises any one or more of a warning signal transmitted to an approaching vehicle that indicates that the docking failure has occurred or control signals transmitted to a vehicle controller of the approaching vehicle to slow or stop the vehicle. The remediating action can include a step 910 of displaying a warning message (e.g., tone, flashes, or message) that is indicative of the docking failure. This step can be performed by any of the charging station and/or a vehicle in communication with the charging station (either direct or indirect communication). Another possible remediation includes a step 912 of transmitting signals to a vehicle controller that causes the vehicle to slow or stop when the vehicle is approaching an area where a docking failure has occurred. This portion of the step related to the transmission of signals can be performed by either the charging station or the charging station server. The actual control of the vehicle is performed by a vehicle controller. Thus, the charging station and/or the charging station server are configured to generate commands or messages that can be interpreted and acted upon by the vehicle controller. In some embodiments, this functionality is performed over a secure and authorized communication channel.

In some embodiments, the method can also include steps such as establishing an ad-hoc or mesh network between a plurality of nodes that include the approaching vehicle and transmitting the warning signal or the control signals to at least one of the plurality of nodes for propagation or delivery to the approaching vehicle. The nodes can include, for example, vehicles, mobile devices, and/or sensors used to detect the proximity of vehicles to the charging station as disclosed above.

The ad-hoc or mesh network can be initiated through a request provided by a controller of the charging station. Again, this configuration is utilized when the charging station needs to communicate with a vehicle that is not in communication range of the charging station.

EXAMPLES

In some instances, the following examples may be implemented together or separately by the systems and methods described herein.

Example 1 may include a system, comprising: a base station providing electrical power; a charging interface configured to couple with a charging port of a vehicle and a cradle of the base station, the charging interface receiving the electrical power from the base station and providing the electrical power to the charging port of the vehicle; and a controller associated with at least one of the base station, the charging interface, or combinations thereof, the controller configured to: execute a docking ruleset to determine when a docking failure occurs between the charging interface and the cradle of the base station; and execute a remediating action in response to the docking failure.

Example 2 may include the system according to example 1, wherein the docking ruleset comprises a failed circuit rule that specifies that the docking failure occurs when a complete circuit is not created between the charging interface and the cradle of the base station within a specified period of time after the charging interface has been removed from the charging port of the vehicle.

Example 3 may include the system according to example 2 and/or some other example herein, wherein the docking ruleset comprises a failed orientation rule that specifies that the docking failure occurs when the charging interface has not achieved an expected charging interface orientation within a specified period of time after the charging interface has been removed from the charging port of the vehicle.

Example 4 may include the system according to example 3 and/or some other example herein, wherein the failed orientation rule further indicates a time frame for which the expected charging interface orientation is maintained by the charging interface.

Example 5 may include the system according to example 1 and/or some other example herein, further comprising a short range wireless module comprising a short range wireless receiver and a short range wireless receiver transmitter, further wherein the docking ruleset comprises a failed short range wireless connection rule that specifies that the docking failure occurs when a short range wireless connection has not been established between the short range wireless receiver and the short range wireless receiver transmitter within a specified period of time.

Example 6 may include the system according to example 5 and/or some other example herein, wherein the specified period of time includes any of: a specified period of time after the charging interface has been removed from the charging port of the vehicle; or a specified period of time after the charging interface has been removed from the cradle of the base station.

Example 7 may include the system according to example 5 and/or some other example herein, wherein the short range wireless module comprises any of Bluetooth low-energy, radio-frequency identification (RFID), or near-field communication (NFC).

Example 8 may include the system according to example 1 and/or some other example herein, further comprising an ultrasonic module, wherein the docking ruleset comprises a failed ultrasonic signal rule, the failed ultrasonic signal rule specifying that the docking failure occurs when a distance between portions of the ultrasonic module associated with the charging interface and the base station exceed a critical distance threshold after a specified period of time after the charging interface has been removed from the charging port of the vehicle.

Example 9 may include the system according to example 1 and/or some other example herein, further comprising a photosensor, wherein the docking ruleset comprises a failed photosensor rule that specifies that a docking failure has occurred when light is sensed by the photosensor after a specified period of time after the charging interface has been removed from the cradle of the base station.

Example 10 may include the system according to example 1 and/or some other example herein, further comprising a communication interface, wherein the remediating action comprises the controller broadcasting a warning signal to a receiver through the communication interface.

Example 11 may include the system according to example 10 and/or some other example herein, wherein the receiver is associated with the vehicle and comprises a human machine interface.

Example 12 may include the system according to example 10 and/or some other example herein, wherein the receiver comprises a mobile device configured to communicate with the communication interface of the system or a server that is coupled with the system, the server relaying the warning signal to the mobile device from the system.

Example 13 may include the system according to example 1 and/or some other example herein, further comprising a vehicle proximity sensor, wherein the controller is configured to: after determining that the docking failure has occurred, receive proximity signals from the proximity sensor that are indicative of an approaching vehicle near the system; transmit a warning signal to the approaching vehicle that indicates that the docking failure has occurred; and wherein the controller is further configured to cause a vehicle controller of the approaching vehicle to slow or stop when the vehicle enters a restricted area around the system during the docking failure.

Example 14 may include a system, comprising: a base station providing electrical power; a charging interface configured to couple with a charging port of a vehicle and a cradle of the base station; and a controller configured to: determine when a docking failure occurs between the charging interface and the cradle of the base station through proximity or orientation of the charging interface; and transmit signals to the vehicle to warn of the docking failure or cause a vehicle controller of the vehicle to slow or stop.

Example 15 may include the system according to example 14, wherein the base station and the charging interface are associated with a parking space, and the controller is further configured to transmit a signal to a reservation service to assign the vehicle to a different parking space when the docking failure occurs.

Example 16 may include a method, comprising: sensing disconnection of a charging interface of an electric vehicle charging station from at least one of: a charging port of a vehicle; or a base station of the electric vehicle charging station; sensing a docking of the charging interface, wherein a docking failure occurs when the docking has not occurred within a specified period of time after the disconnection has been sensed; and executing a remediating action when the docking failure occurs.

Example 17 may include the method according to example 16, wherein the docking failure is determined based on any of: an orientation of the charging interface measured over a period of time; a failure to complete a circuit between the charging interface and the base station during docking; or proximity of the charging interface to the base station.

Example 18 may include the method according to example 17 and/or some other example herein, wherein the remediating action comprises transmitting any of: a warning signal to an approaching vehicle that indicates that the docking failure has occurred; or control signals to a vehicle controller of the approaching vehicle to slow or stop the vehicle.

Example 19 may include the method according to example 18 and/or some other example herein, further comprising: establishing an ad-hoc or mesh network between a plurality of nodes that include the approaching vehicle; and transmitting the warning signal or the control signals to at least one of the plurality of nodes for propagation or delivery to the approaching vehicle.

Example 20 may include the method according to example 19 and/or some other example herein, further comprising: after determining that the docking failure has occurred, receiving proximity signals from a proximity sensor that are indicative of an approaching vehicle transmitting a warning signal to the approaching vehicle that indicates that the docking failure has occurred; and wherein the controller is further configured to cause a vehicle controller of the approaching vehicle to slow or stop when the vehicle enters a restricted area during the docking failure.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   a base station providing electrical power;
   a charging interface configured to couple with a charging port of a vehicle and a cradle of the base station, the charging interface receiving the electrical power from the base station and providing the electrical power to the charging port of the vehicle; and
   a controller associated with at least one of the base station, the charging interface, or combinations thereof, the controller configured to:
   execute a docking ruleset to determine when a docking failure occurs between the charging interface and the cradle of the base station; and
   execute a remediating action in response to the docking failure.

2. The system according to claim 1, wherein the docking ruleset comprises a failed circuit rule that specifies that the docking failure occurs when a complete circuit is not created between the charging interface and the cradle of the base station within a specified period of time after the charging interface has been removed from the charging port of the vehicle.

3. The system according to claim 2, wherein the docking ruleset comprises a failed orientation rule that specifies that the docking failure occurs when the charging interface has not achieved an expected charging interface orientation within a specified period of time after the charging interface has been removed from the charging port of the vehicle.

4. The system according to claim 3, wherein the failed orientation rule further indicates a time frame for which the expected charging interface orientation is maintained by the charging interface.

5. The system according to claim 1, further comprising a short range wireless module comprising a short range wireless receiver and a short range wireless receiver transmitter, further wherein the docking ruleset comprises a failed short range wireless connection rule that specifies that the docking failure occurs when a short range wireless connection has not been established between the short range wireless receiver and the short range wireless receiver transmitter within a specified period of time.

6. The system according to claim 5, wherein the specified period of time includes any of:
   a specified period of time after the charging interface has been removed from the charging port of the vehicle; or
   a specified period of time after the charging interface has been removed from the cradle of the base station.

7. The system according to claim 5, wherein the short range wireless module comprises any of Bluetooth low-energy, radio-frequency identification (RFID), or near-field communication (NFC).

8. The system according to claim 1, further comprising an ultrasonic module, wherein the docking ruleset comprises a failed ultrasonic signal rule, the failed ultrasonic signal rule specifying that the docking failure occurs when a distance between portions of the ultrasonic module associated with the charging interface and the base station exceed a critical distance threshold after a specified period of time after the charging interface has been removed from the charging port of the vehicle.

9. The system according to claim 1, further comprising a photosensor, wherein the docking ruleset comprises a failed photosensor rule that specifies that a docking failure has occurred when light is sensed by the photosensor after a specified period of time after the charging interface has been removed from the cradle of the base station.

10. The system according to claim 1, further comprising a communication interface, wherein the remediating action comprises the controller broadcasting a warning signal to a receiver through the communication interface.

11. The system according to claim 10, wherein the receiver is associated with the vehicle and comprises a human machine interface.

12. The system according to claim 10, wherein the receiver comprises a mobile device configured to communicate with the communication interface of the system or a server that is coupled with the system, the server relaying the warning signal to the mobile device from the system.

13. The system according to claim 1, further comprising a vehicle proximity sensor, wherein the controller is configured to:

after determining that the docking failure has occurred, receive proximity signals from the proximity sensor that are indicative of an approaching vehicle near the system;
transmit a warning signal to the approaching vehicle that indicates that the docking failure has occurred; and
wherein the controller is further configured to cause a vehicle controller of the approaching vehicle to slow or stop when the vehicle enters a restricted area around the system during the docking failure.

14. A system, comprising:
a base station providing electrical power;
a charging interface configured to couple with a charging port of a vehicle and a cradle of the base station; and
a controller configured to:
determine when a docking failure occurs between the charging interface and the cradle of the base station through proximity or orientation of the charging interface; and
transmit signals to the vehicle to warn of the docking failure or cause a vehicle controller of the vehicle to slow or stop.

15. The system according to claim 14, wherein the base station and the charging interface are associated with a parking space, and the controller is further configured to transmit a signal to a reservation service to assign the vehicle to a different parking space when the docking failure occurs.

16. A method, comprising:
sensing disconnection of a charging interface of an electric vehicle charging station from at least one of:
a charging port of a vehicle; or
a base station of the electric vehicle charging station;
sensing a docking of the charging interface, wherein a docking failure occurs when the docking has not occurred within a specified period of time after the disconnection has been sensed; and
executing a remediating action when the docking failure occurs.

17. The method according to claim 16, wherein the docking failure is determined based on any of:
an orientation of the charging interface measured over a period of time;
a failure to complete a circuit between the charging interface and the base station during docking; or
proximity of the charging interface to the base station.

18. The method according to claim 17, wherein the remediating action comprises transmitting any of:
a warning signal to an approaching vehicle that indicates that the docking failure has occurred; or
control signals to a vehicle controller of the approaching vehicle to slow or stop the vehicle.

19. The method according to claim 18, further comprising:
establishing an ad-hoc or mesh network between a plurality of nodes that include the approaching vehicle; and
transmitting the warning signal or the control signals to at least one of the plurality of nodes for propagation or delivery to the approaching vehicle.

20. The method according to claim 19, further comprising:
after determining that the docking failure has occurred, receiving proximity signals from a proximity sensor that are indicative of an approaching vehicle;
transmitting a warning signal to the approaching vehicle that indicates that the docking failure has occurred; and
wherein the controller is further configured to cause a vehicle controller of the approaching vehicle to slow or stop when the vehicle enters a restricted area during the docking failure.

* * * * *